Dec. 15, 1953  L. B. McMANIS ET AL  2,663,002
ATTENUATOR FOR SEISMIC GAIN CONTROL
Filed June 20, 1950
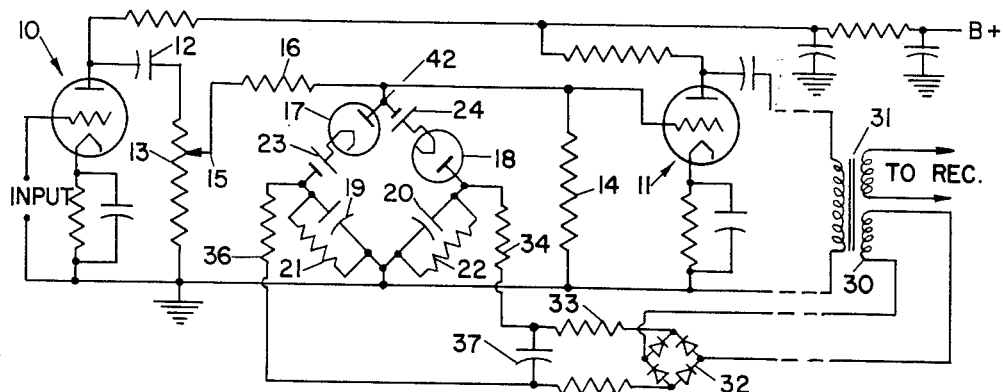
FIG. 1
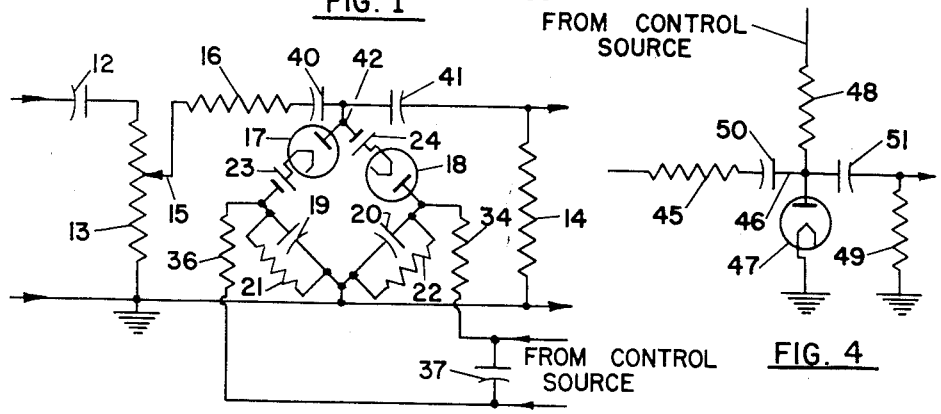
FIG. 2
FIG. 4
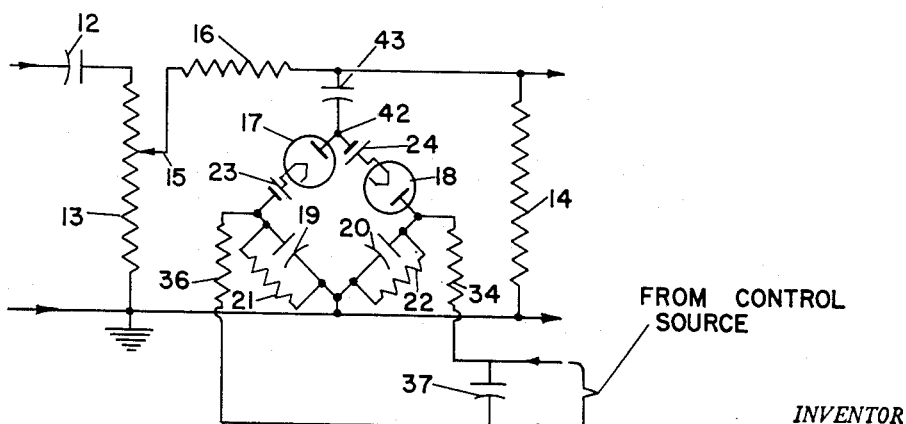
FIG. 3
*INVENTORS:*
LOUIS B. McMANIS
JACK R. COOPER
BY Newell Pottoff
ATTORNEY Patented Dec. 15, 1953

2,663,002

UNITED STATES PATENT OFFICE 2,663,002

ATTENUATOR FOR SEISMIC GAIN CONTROL

Louis B. McManis and Jack R. Cooper, Tulsa, Okla., assignors to Stanolind Oil and Gas Company, Tulsa, Okla., a corporation of Delaware Application June 20, 1950, Serial No. 169,176

3 Claims. (Cl. 323—23)

This invention relates to automatic gain-control attenuators and is directed particularly to an electronic attenuating circuit of improved stability especially useful in amplifiers of the type used for seismic geophysical surveying.

In seismic surveying the problem of controlling the gain of the amplifying system is particularly difficult due both to the very wide variations in level of the seismic signals and to the frequency of certain signals of interest being very close to, or actually overlapping, the frequency response of the gain-control system. A further complication is the fact that commercial seismic exploration systems invariably utilize a plurality of pickups and amplifying channels for recording a plurality of traces, so that noise signals may be recognized by the lack of similarity between traces. This imposes the additional requirement on the gain-control system either that all channels must be controlled from a single control-signal source, thus presenting opportunities for cross-feed between channels; or, if separate controls are used in each amplifying channel, they must be accurately matched.

In an effort to obtain the wide range of gain control needed, advantage has been taken of the non-linear characteristics of thermionic diodes, preferably by utilizing such diodes in a bridge circuit forming one arm of an attenuator between the stages of an amplifier channel. A particular advantage of the arrangement of the diodes in a bridge circuit is that any ripple voltage remaining on the direct-current control signal is balanced out and does not reappear in the signal channel. This, however, presupposes that the diodes in the bridge circuit have and retain throughout their useful lives substantially similar and unvarying characteristics. Unfortunately, it is found in practice that all of the thermionic diodes commercially available are widely variable as to their characteristics, both when new and during their lifetimes, so that it is quite rare that two diodes picked at random will have and retain sufficiently similar characteristics to form a balanced bridge circuit. As a matter of fact, it is generally a difficult and tedious procedure to match, and maintain matched, the thermionic diodes employed in a set of amplifying channels used in seismic surveying.

It is accordingly a primary object of our invention to provide an improved thermionic diode-type of attenuator for a gain-control circuit adapted particularly to seismic surveying. Another object is to provide a diode-type attenuator circuit in which the selection of the diodes employed is quite non-critical, and a substantial balance is maintained both within a given amplifying channel and as between the different channels. A further object is to provide a variable resistance circuit for an attenuator, utilizing thermionic diodes and taking advantage of a hitherto little-known property of such diodes that, within a certain operating range, their dynamic resistance is almost entirely a function of the current through them. Other and further objects, uses, and advantages of the invention will become apparent as the description proceeds.

The foregoing and other objects are accomplished by so arranging the one or more thermionic diodes in an attenuator that the amount of current flowing through the diode to determine its dynamic resistance is very accurately regulated; and, if two diodes are used in a bridge or other relationship, exactly the same control current is forced to flow through both. When this is done, for example, by inserting control-current blocking condensers in the electrical signal leads associated with the diodes and then applying direct current as the control, the two diodes being in series with respect to the control current where more than one is used, it is found that the dynamic resistances, and hence the attenuating characteristics of the diodes, are substantially identical.

This will be better understood by reference to the accompanying drawings forming a part of this application, in which drawings the same reference numerals are applied to the same or corresponding parts in the different figures. In these drawings:

Figure 1 is a circuit diagram of part of an amplifier channel employing a diode bridge attenuator in the conventional manner;

Figure 2 is a circuit diagram similar to Figure 1 showing the improved circuit of the invention;

Figure 3 is an alternative embodiment of the circuit of the invention; and

Figure 4 is a circuit diagram of a simple attenuator employing the principles of the invention and having an accurately determined attenuation characteristic.

Referring now to these drawings and in particular to Figure 1, an amplifier channel is shown schematically, employing a conventional type of diode gain control. Thus this amplifier channel may include two or more stages of amplification 10 and 11 coupled by a conventional resistance-capacity coupling, including the condenser 12, a load resistance 13, and an input resistor 14 connected between the grid of amplifier stage 11 and ground. Resistor 13 may have a movable tap 15 for adjustment of the overall level of gain.

Included between tap 15 and input resistor 14 is an attenuating circuit of the L-pad type, for example, comprising a series resistance 16 and a shunt resistance to ground, in the form of a bridge circuit having two thermionic diodes 17 and 18, connected in series in one branch of the bridge, while the other branch includes the condensers 19 and 20 in series, respectively shunted by resistances 21 and 22. In the branch arm including the diode 17 is a biasing battery 23, while in the arm including diode 18 is a similar biasing battery 24. The bridge point 42 between the diodes is connected to the signal-circuit lead which includes the resistance 16, while the bridge point between the condensers 19 and 20 is connected to the ground side of the amplifier circuit. Across the opposite diagonal of the bridge is applied a direct-current control voltage taken from some suitable point in the amplifier, such as from a winding 30 of the output transformer 31, the voltage in winding 30 being rectified by a bridge rectifier 32 and filtered by series resistances 33, 34, 35, and 36, shunted by the capacitance 37.

With such a circuit it will be seen that the effective resistance across the vertical diagonal of the bridge can be varied by the direct-current voltage applied across the horizontal diagonal; and, if the characteristics of the diodes 17 and 18 are sufficiently identical and the bridge is otherwise balanced—for example, by adjusting resistors 21 and 22—the control voltage will not appear in the signal circuit to the stage 11. Thus, if there is any unfiltered ripple component on the control voltage applied across the horizontal bridge diagonal, it will not appear in the main amplifier channel.

It has been found by experience, however, that the thermionic diodes 17 and 18 are almost always of sufficiently different characteristics that the bridge is unbalanced. If diodes are found which are reasonably similar and are inserted in the bridge as a matched pair, it is frequenly only a very short time until the changes of the emitting characteristics of the cathodes with age upset this balance. If careful measurements are made on this circuit when it is unbalanced, it is invariably found that, when a given direct-current control voltage is applied across the horizontal diagonal of the bridge, the resultant control currents through the respective diodes 17 and 18 are unequal. This is due to the fact that the resistance 14 and the resistances 13 and 16 form alternate paths to ground in parallel with the diodes, so that unequal diode resistances cause a redistribution of control current in the network, and part of it appears in the signal channel.

On the other hand, when blocking condensers 40 and 41 are inserted in the signal-carrying leads connected to the common point 42 between the diodes 17 and 18, as shown in Figure 2, the direct-current resistances to ground of the circuits shunting the diodes 17 and 18 are raised to such high values that the two diodes, for direct current or low frequency alternating currents, are effectively in series without shunts, substantially equal control currents flow through them, and their dynamic resistances become substantially identical. This is true despite considerable apparent differences in the cathode emission characteristics, differences in aging of the cathodes, and other factors. Consequently, for this circuit, the bridge remains substantially balanced, and the control-current leakage into the signal channel is minimized.

In Figure 3, the same principle is employed, of isolating the bridge point 42 for direct current, by the single blocking condenser 43, connected between the point 42 and the signal-carrying lead. For low-frequency signal currents, however, the required capacity of condenser 43 may rather high to prevent its reactance from being comparable in value with the lowest resistance of the diodes, thus causing undesirable phase shifts of the signals being attenuated. For wave frequencies of interest in seismic surveying, for example, the circuit of Figure 2 is preferable.

In Figure 4 is shown an attenuator circuit employing a single diode. This attenuator comprises the series resistance 45 in the signal lead 46 with the single diode 47 forming a shunt resistance to ground from the lead 46. Through a large resistance 48 a direct-current control voltage is applied to the single diode 47, varying its effective alternating-current resistance to signals passing along the lead 46. If the signal path 46 is part of an amplifying circuit, it may also be shunted to ground by a grid input resistance 49. A pair of blocking condensers 50 and 51 is inserted in the lead 46 on either side of the point of connection of the diode 47 to the lead, so that all direct current flowing through the large control resistor 48 also flows through the diode 47. Without condensers 50 and 51 being present, part of this current might also flow along the lead 46 and to ground by other paths—for example, through the resistance 49. However, since substantially all of this current is forced to flow through the diode 47, the dynamic resistance of the diode is accurately determined to a known value, depending substantially only on the magnitude of the control voltage. Variations of this value of dynamic resistance with cathode emission, aging, and the like are negligible.

The reason for the improved operation of diodes as variable resistance elements in the manner described is believed to be explainable on the basis of the following theory: There are three clearly distinguishable conditions of current flow from the cathode to the anode of a thermionic diode. When a large positive voltage is applied to the anode, relative to the cathode, substantially all of the emitted electrons are drawn to the anode, and the current is a "saturation" current. For a range of lesser positive anode voltages, the current is governed by the space charge conditions surrounding the cathode and is proportional to the 3/2 power of the applied voltage. For a range of very small positive, zero, or even small negative voltages, the factor regulating the magnitude of the current from the cathode to the anode is the initial velocity of the electrons given off by the thermionic cathode.

In the present invention, the diodes are always operated in this last region, where the slope of the cathode-anode voltage-current curve or "characteristic" is determined by the electron initial velocities. For brevity, this condition of operation will be referred to as in the "electron initial velocity" region. Thus, it is the function of the biasing potential sources 23 and 24, when combined with the control voltage, to bring the anodes of diodes 17 and 18 to the proper small or negative voltage so that the diodes operate in this region. In this case, the current through the diode is given by the formula:

$$I = I_0 \frac{2}{\sqrt{\pi}} \sqrt{\frac{eV}{kT}} \cdot \epsilon^{\frac{-eV}{kT}} \qquad (1)$$

where
- $I$ = D.-C. diode current
- $I_0$ = saturation current
- $e$ = electron charge
- $V$ = plate-cathode voltage
- $k$ = Boltzmann's constant
- $T$ = temperature, absolute
- $\epsilon$ = 2.71828

Since $I_0$ is constant for any given temperature $T$, taking the logarithms of both sides of this equation gives:

$$\log_{10} I = \text{constant} + \log_{10}\sqrt{\frac{eV}{kT}} - \frac{eV}{kT}\log_{10}\epsilon \quad (2)$$

In this expression the term:

$$\log_{10}\sqrt{\frac{eV}{kT}}$$

is small compared to $$\frac{eV}{kT}$$

and so may be considered approximately constant. Then Equation 2 becomes:

$$\log_{10} I = K - V\frac{e\log_{10}\epsilon}{kT} \quad (3)$$

Plotting $\log_{10} I$ against the voltage $V$ in the region of interest yields a straight line of slope $$-.4343\frac{e}{kT}$$

The dynamic resistance of the diode is given by:

$$r_p = \frac{dV}{dI} = \frac{kT}{e}\frac{1}{I} \quad (4)$$

Thus, it appears that the dynamic resistance $r_p$ is a function of substantially only $I$ and $T$; and, since it is not difficult to maintain $T$ relatively constant, then the dynamic resistance is a function only of the current $I$. Thus, when the current $I$ is maintained at a known and fixed value for a single diode or is made exactly equal for two diodes in series by means of blocking condensers in all circuits shunting the diodes, the characteristics of the diodes utilized in the present invention are accurately known and controlled. It is no longer necessary to exercise care in selecting or maintaining the diodes matched as to their direct-current characteristics, as the characteristic important in this invention is determined accurately by controlling the current $I$.

While our invention has been described with particular reference to amplifiers suitable for seismic surveying where accurate balance within and between channels operating in parallel is desired, it is to be understood that this is by way of example only, and the same manner of diode control can be applied in other circuit arrangements. Specifically, it is, of course, obvious that the series and shunt arms of the attenuating circuit can be interchanged so that the diode bridge is used as the series resistance, or even as both a series and shunt resistance. It is only necessary that the blocking condensers be of sufficiently high D. C. resistance as to have negligible leakage current, compared to the diode current, while at the same time their impedance is small for the alternating-current signals to be transmitted through the attenuator.

Further, although the description has referred to the signal-transmission channel as consisting of an insulated lead and "ground," it is equally applicable to a "pair" of leads, and it is not necessary that either of the pair be at "ground" potential. Similarly, while only an L-pad attenuating circuit has been illustrated, the variable resistance elements of the invention are also useful in any other of the well-known attenuator networks having multiple series or shunt resistances in various combinations. The scope of the invention should therefore not be considered as limited solely to the described embodiments, but is to be ascertained from the appended claims.

We claim:

1. In an attenuator circuit comprising a pair of signal-transmission leads, at least one series resistance in and at least one shunt resistance between said leads, at least one of said resistances comprising a variable-resistance bridge circuit having two thermionic diodes connected in series in one branch of the bridge, a pair of condensers connected in series in the other branch of said bridge, a resistance connected in parallel with each condenser, a source of unidirectional control current connected across the diagonal of said bridge between the diode-to-condenser junction points, the resistance of said bridge across the other diagonal (from the junction point of said condensers to the junction point of said diodes) being the variable resistance of said attenuator circuit, direct-current bias voltage means in series with said diodes and combining with said unidirectional control current to operate said diodes at all times in the electron initial velocity region, the improvement comprising means substantially completely isolating said diode junction point for direct current, whereby substantially identical direct currents flow through said diodes, said isolating means possessing at signal frequencies an impedance low compared to said resistances.

2. The improvement according to claim 1 in which said isolating means is a condenser.

3. The improvement according to claim 1 in which said isolating means comprises a condenser in each signal circuit lead connected to said junction point.

LOUIS B. McMANIS.
JACK R. COOPER.

References Cited in the file of this patent

UNITED STATES PATENTS

| Number | Name | Date |
|---|---|---|
| 2,329,558 | Scherbatskoy | Sept. 14, 1943 |
| 2,341,336 | Singer | Feb. 8, 1944 |
| 2,373,569 | Kannenberg | Apr. 10, 1945 |
| 2,528,885 | Hendricks | Nov. 7, 1950 |